United States Patent
Kim

(10) Patent No.: US 9,725,880 B2
(45) Date of Patent: Aug. 8, 2017

(54) APPARATUS FOR CONTROLLING A CASCADED HYBRID CONSTRUCTION MACHINE SYSTEM AND A METHOD THEREFOR

(75) Inventor: Chong-Chul Kim, Seoul (KR)

(73) Assignee: VOLVO CONSTRUCTION EQUIPMENT AB (SE)

( * ) Notice: Subject to any disclaimer, the term of this patent is extended or adjusted under 35 U.S.C. 154(b) by 18 days.

(21) Appl. No.: 14/400,466

(22) PCT Filed: Jun. 8, 2012

(86) PCT No.: PCT/KR2012/004548
§ 371 (c)(1),
(2), (4) Date: Nov. 11, 2014

(87) PCT Pub. No.: WO2013/183802
PCT Pub. Date: Dec. 12, 2013

(65) Prior Publication Data
US 2015/0159346 A1 Jun. 11, 2015

(51) Int. Cl.
*E02F 9/20* (2006.01)
*B60W 20/00* (2016.01)
(Continued)

(52) U.S. Cl.
CPC .............. *E02F 9/2091* (2013.01); *B60K 6/46* (2013.01); *B60W 10/26* (2013.01); *B60W 20/13* (2016.01);
(Continued)

(58) Field of Classification Search
CPC .... B60W 10/24; B60W 10/26; B60W 20/106; B60W 20/13; B60W 2710/248;
(Continued)

(56) References Cited

U.S. PATENT DOCUMENTS 8,321,094 B2 11/2012 Okano et al.
8,364,333 B2 1/2013 Yanagisawa
(Continued)

FOREIGN PATENT DOCUMENTS

CN 101688384 A 3/2010
CN 102388227 A 3/2012
(Continued)

OTHER PUBLICATIONS

First Office Action issued by the State Intellectual Property Office (SIPO) of People's Republic of China issued on Dec. 2, 2015 with English translation (13 pages).
(Continued)

*Primary Examiner* — Khoi Tran
*Assistant Examiner* — Robert Nguyen
(74) *Attorney, Agent, or Firm* — Harness, Dickey & Pierce, P.L.C.

(57) ABSTRACT

The present invention relates to an apparatus for controlling a cascaded hybrid construction machine system and a method therefor, which apparatus includes: a control part for controlling an electric motor for driving an actuator differently according to whether or not the actuator performs a recovery action and whether or not an energy storage device can be recharged; and a motor driver for driving or stopping the electric motor by switching under the control of the control unit, wherein when the actuator performs a recovery action for both the overcharged state and the failure state of the energy storage device, the motor for driving the actuator is temporarily stopped by the switching of the motor driver so as to restrain the recovery energy generated, thus protecting the hybrid power source system and keeping the operator safe as well as resolving the problem of the working time being increased due to the system's shutting off.

2 Claims, 3 Drawing Sheets

(51) Int. Cl.
*B60W 10/26* (2006.01)
*B60W 20/13* (2016.01)
*B60W 20/50* (2016.01)
*B60K 6/46* (2007.10)

(52) U.S. Cl.
CPC ......... *B60W 20/50* (2013.01); *B60W 2300/17* (2013.01); *B60W 2510/244* (2013.01); *B60W 2710/248* (2013.01); *B60W 2710/305* (2013.01); *E02F 9/2075* (2013.01); *Y02T 10/6217* (2013.01); *Y02T 10/92* (2013.01); *Y10S 903/903* (2013.01)

(58) Field of Classification Search
CPC ........... B60W 2710/305; B60W 20/50; B60W 2510/244; B60W 2300/17; E02F 9/2075; E02F 9/2091; Y10S 903/903; B60K 6/46; Y02T 10/42; Y02T 10/6217
USPC .................. 180/65.245; 701/22, 50; 903/903
See application file for complete search history.

(56) References Cited

U.S. PATENT DOCUMENTS

| | | | | |
|---|---|---|---|---|
| 2010/0222970 A1* | 9/2010 | Shono | .................. | B60L 15/20 701/50 |
| 2010/0268407 A1* | 10/2010 | Yanagisawa | ............. | B60K 6/46 701/22 |
| 2010/0270095 A1* | 10/2010 | Shono | .................. | E02F 9/2246 180/65.29 |
| 2010/0280697 A1* | 11/2010 | Yanagisawa | .......... | E02F 9/2246 701/22 |
| 2010/0332088 A1 | 12/2010 | Okano et al. | | |
| 2011/0077825 A1* | 3/2011 | Sano | .................... | E02F 9/2246 701/42 |
| 2011/0093150 A1* | 4/2011 | Yanagisawa | .......... | B60W 20/13 701/22 |
| 2011/0251746 A1* | 10/2011 | Wu | .......................... | B60K 6/48 701/22 |
| 2011/0265467 A1* | 11/2011 | Kawasaki | ............. | E02F 9/2075 60/420 |
| 2012/0130576 A1* | 5/2012 | Sugiyama | ................ | B60K 6/12 701/22 |
| 2012/0144819 A1* | 6/2012 | Kawashima | ........... | B60K 6/485 60/459 |
| 2012/0167561 A1* | 7/2012 | Ono | ........................ | B60K 6/46 60/486 |
| 2012/0187756 A1* | 7/2012 | Yanagisawa | .......... | B60L 11/005 307/9.1 |
| 2014/0222274 A1* | 8/2014 | Sugiyama | ............. | E02F 9/2075 701/22 |
| 2014/0277970 A1* | 9/2014 | Sakamoto | ............... | E02F 9/123 701/50 |
| 2015/0025726 A1* | 1/2015 | Yamashita | ............ | B60W 10/26 701/22 |
| 2015/0086315 A1* | 3/2015 | Hirozawa | ............. | E02F 9/2095 414/687 |

FOREIGN PATENT DOCUMENTS

| | | |
|---|---|---|
| JP | 2009-235707 A | 10/2009 |
| JP | 2011-017427 A | 1/2011 |
| KR | 10-2010-0057780 A | 6/2010 |
| KR | 10-2010-0115706 A | 10/2010 |

OTHER PUBLICATIONS

International Search Report (in Korean and English) and Written Opinion (in Korean) for PCT/KR2012/004548, mailed Feb. 14, 2013; ISA/KR.

* cited by examiner

APPARATUS FOR CONTROLLING A CASCADED HYBRID CONSTRUCTION MACHINE SYSTEM AND A METHOD THEREFOR

FIELD OF THE INVENTION

The present invention relates to an apparatus and method for controlling a series hybrid construction machine system. More particularly, the present invention relates to an apparatus and method for controlling a series hybrid construction machine system, in which the generation of regenerative energy is suppressed by temporarily stopping an electric motor that drives an actuator using the switching of a motor driver during the regenerative operation with respect to an overcharged or failed state of an energy storage device so that a hybrid power source system can be protected, an operator's safety can be ensured, and a problem of work time delay due to a system shutdown can be solved.

BACKGROUND OF THE INVENTION

Conventionally, an apparatus for controlling a hybrid construction machine system performs a control operation of charging and discharging electric energy and a state monitoring operation of SOC (State of Charge) by a controller, for instance, in dependence on an energy storage device-only controller (BMS/CMU) so as to control an energy storage device.

In addition, the conventional control apparatus of the hybrid construction machine system performs a control operation by receiving a feedback signal indicative of voltage, current, temperature, or the like of the energy storage device through a communication with a hybrid controller. However, such a conventional control apparatus entails a problem in that since it is less associated with either an operation of an actuator or a work in a situation that is not predicted by a user of the hybrid construction machine, a work time is delayed and damage or danger is caused to an operator and a work environment due to the operation stop of the construction machine caused by an extreme measure called a "system shutdown" in a situation where either the operation of the actuator or the work in the unpredicted situation are not taken into consideration during the development of the control apparatus.

Further, the conventional control apparatus involves a problem in that the time required to restore the system is extended.

DETAILED DESCRIPTION OF THE INVENTION

Technical Problems

Accordingly, the present invention has been made to solve the aforementioned problems occurring in the prior art, and it is an object of the present invention to provide an apparatus and method for controlling a series hybrid construction machine system in which the generation of regenerative energy is suppressed by temporarily stopping an electric motor that drives an actuator using the switching of a motor driver during the regenerative operation with respect to an overcharged or failed state of an energy storage device so that a hybrid power source system can be protected, an operator's safety can be ensured, and a problem of work time delay due to a system shutdown can be solved.

Technical Solution

To accomplish the above object, in accordance with an embodiment of the present invention, there is provided an apparatus for controlling a series hybrid construction machine system, the apparatus including: a control unit configured to differently control an electric motor 300 that drives an actuator based on a result of determining whether the actuator of the construction machine performs a regenerative operation and whether an energy storage device is in an unchargeable state; and a motor driver 200 switched under the control of the control unit 100 and configured to drive or stop the electric motor 300.

Preferably, the control unit may include: a first determination module configured to determine whether the actuator of the construction machine performs the regenerative operation based on a value obtained by converting an operation value of a joystick into a digital value; a second determination module configured to determine whether the energy storage device is in the unchargeable state based on an SOC (State of Charge) value obtained from the energy storage device; and a first control module configured to control the motor driver 200 to stop the electric motor that drives the actuator if it is determined that the actuator of the construction machine performs the regenerative operation and the energy storage device is in the unchargeable state as a result of determination by the first and second determination modules.

In addition, the second determination module may determine that the energy storage device is in the unchargeable state if the SOC value acquired from the energy storage device is equal to or larger than 1 (fully charged state) or the SOC value is not determined to be a constant value (failed state).

Preferably, the control unit 100 may further include a second control module 104 configured to perform a discharge priority control of the energy storage device according to a discharge priority mode that is set after the stop of the electric motor 300.

To accomplish the above object, in accordance with another embodiment of the present invention, there is provided a method for controlling a series hybrid construction machine system including a control unit 100 configured to control an electric motor 300 and a motor driver 200 configured to drive or stop the electric motor 300, the method including: a first determination step of determining whether an actuator of the construction machine performs a regenerative operation based on a value obtained by converting a manipulation value of a joystick into a digital value; a second determination step of determining whether an energy storage device is in an unchargeable state based on an SOC (State of Charge) value obtained from the energy storage device; and a first control step of controlling the motor driver 200 to stop the electric motor 300 that drives the actuator if it is determined that the actuator of the construction machine performs the regenerative operation and the energy storage device is in the unchargeable state as a result of determination by first and second determination steps.

Preferably, the second determination step may determine that the energy storage device is in the unchargeable state if the SOC value acquired from the energy storage device is equal to or larger than 1 (fully charged state) or the SOC value is not determined to be a constant value (failed state).

In addition, the method may further include a second control step of performing a discharge priority control of the energy storage device according to a discharge priority mode that is set after the stop of the electric motor 300.

Advantageous Effect

The apparatus and method for controlling a series hybrid construction machine system in accordance with an embodiment of the present invention as constructed above has the following advantages.

The generation of regenerative energy is suppressed by temporarily stopping the electric motor that drives the actuator using the switching of a motor driver during the regenerative operation with respect to an overcharged or failed state of the energy storage device so that the hybrid power source system can be protected and an operator's safety can be ensured. In addition, a problem of work time delay due to the system shutdown can be solved.

Furthermore, advantageously, the generation of regenerative energy is suppressed through the control of the electric motor that drives the actuator of a series hybrid excavator so that a safe and stable hybrid excavator can be provided to consumers.

BRIEF DESCRIPTION OF THE DRAWINGS

The above objects, other features and advantages of the present invention will become more apparent by describing the preferred embodiments thereof with reference to the accompanying drawings, in which.

PREFERRED EMBODIMENTS OF THE INVENTION

Figure 1:
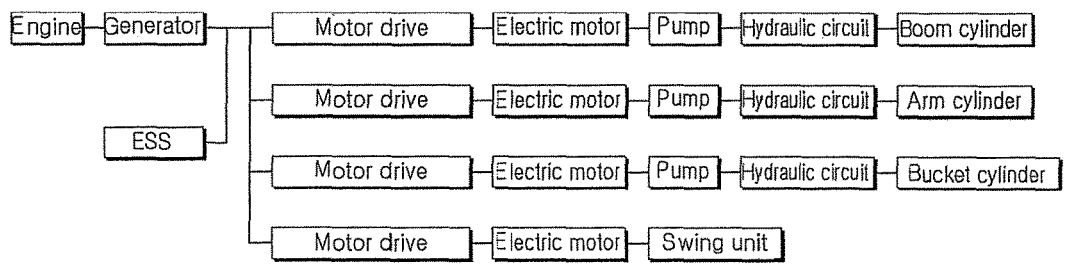
FIG. 1 is a conceptual diagram showing a general series hybrid construction machine system.

Now, preferred embodiments of the present invention will be described in detail with reference to the accompanying drawings. The matters defined in the description, such as the detailed construction and elements, are nothing but specific details provided to assist those of ordinary skill in the art in a comprehensive understanding of the invention, and the present invention is not limited to the embodiments disclosed hereinafter.

In order to definitely describe the present invention, a portion having no relevant to the description will be omitted, and through the specification, like elements are designated by like reference numerals.

In the specification and the claims, when a portion includes an element, it is meant to include other elements, but not exclude the other elements unless otherwise specifically stated herein.

Figure 2:
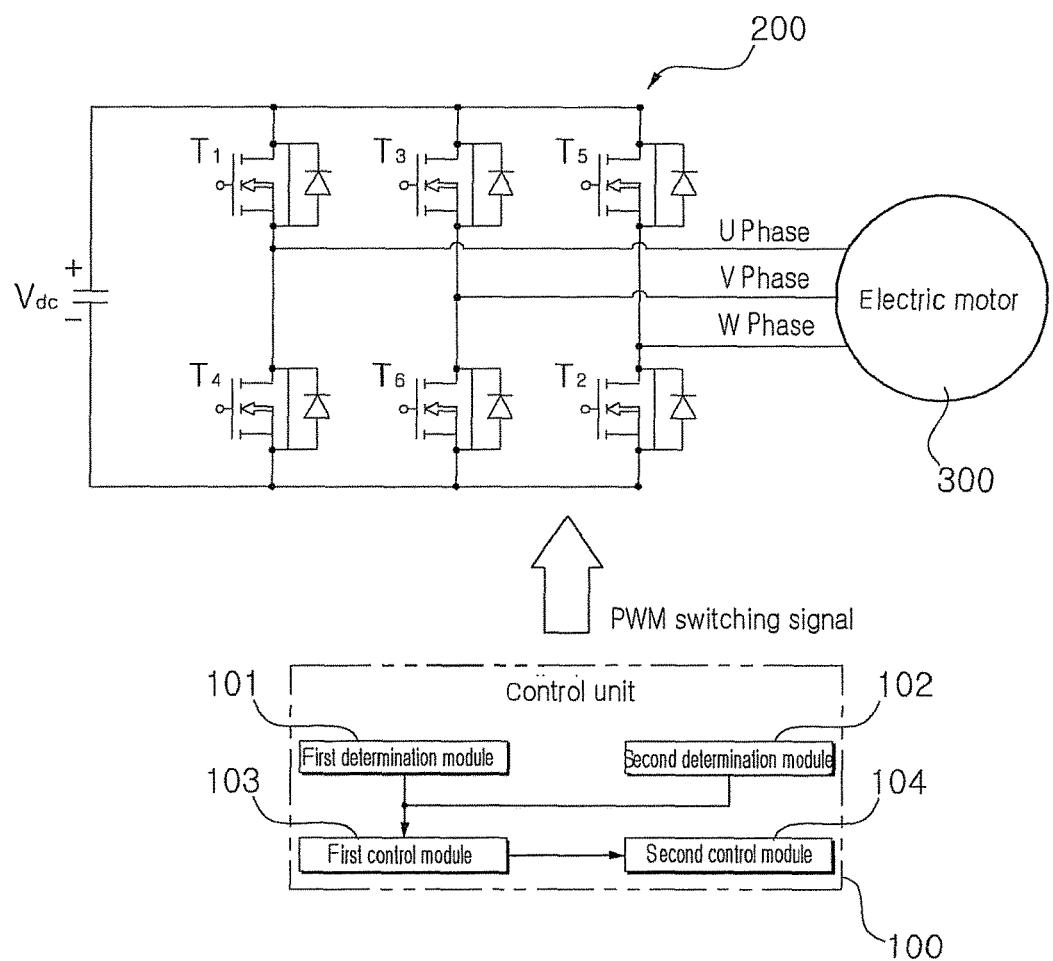
FIG. 2 is a block diagram showing a configuration of an apparatus for controlling a series hybrid construction machine system in accordance with an embodiment of the present invention.

FIG. 2 is a block diagram showing a configuration of an apparatus for controlling a series hybrid construction machine system in accordance with an embodiment of the present invention.

As shown in FIG. 2, the apparatus for controlling a series hybrid construction machine system in accordance with an embodiment of the present invention has a structure which includes a control unit 100 and a motor driver 200 configured to drive or stop an electric motor 300 under the control of the control unit 100. The control unit 100 includes a first module 101, a second module 102, a first control module 103, and a second control module 104.

Herein, the control unit 100 is configured to differently control an electric motor 300 that drives an actuator based on a result of determining whether the actuator of the construction machine performs a regenerative operation and whether an energy storage device is in an unchargeable state. For example, the control unit 100 can include a first determination module 101 that is configured to determine whether the actuator of the construction machine performs the regenerative operation based on a value obtained by converting a manipulation value of a joystick into a digital value; a second determination module 102 that is configured to determine whether the energy storage device is in the unchargeable state based on an SOC (State of Charge) value obtained from the energy storage device; and a first control module 103 that is configured to control the motor driver 200 to stop the electric motor 300 that drives the actuator if it is determined that the actuator of the construction machine performs the regenerative operation and the energy storage device is in the unchargeable state as a result of determination by the first and second determination modules 101 and 102. The second determination module 102 determines that the energy storage device is in the unchargeable state if the SOC value acquired from the energy storage device is equal to or larger than 1 (fully charged state) or the SOC value is not determined to be a constant value (failed state). The failed state is a state in which the regenerative energy cannot be stored in the energy storage device such as destruction of cells due to imbalance between cells of the energy storage device, failure of an energy storage device controller, destruction of the energy storage device due to overcharge/discharge, and failure of the energy storage device. Meanwhile, the control unit 100 may further include a second control module 104 that is configured to perform a discharge priority control of the energy storage device according to a discharge priority mode that is set after the stop of the electric motor 300.

Figure 3:
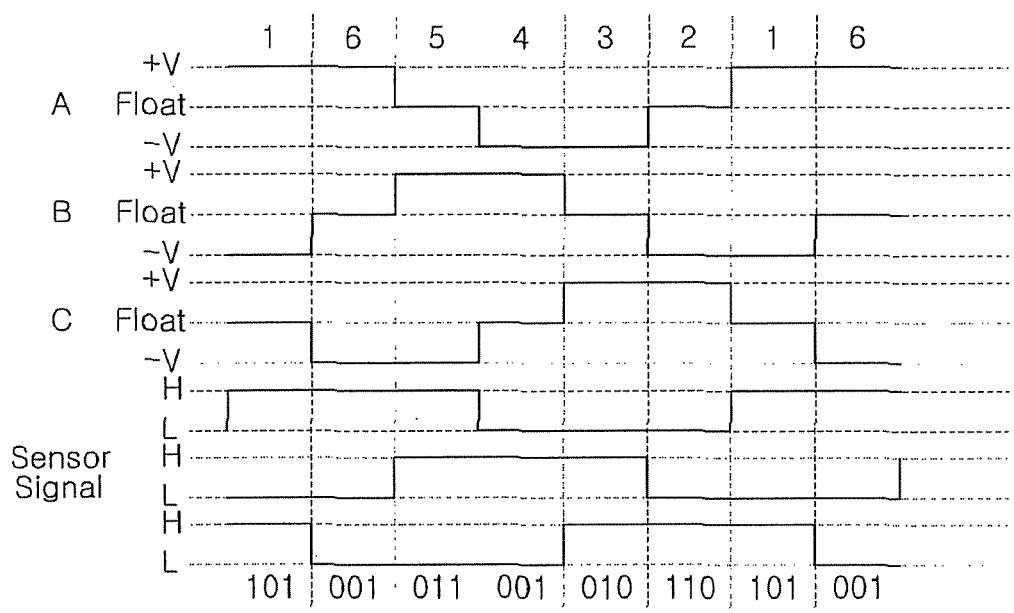
FIG. 3 is a timing chart showing the switching order of a motor driver that drives an electric motor used in an apparatus for controlling a series hybrid construction machine system in accordance with an embodiment of the present invention.

The motor driver 200 is switched under the control of the control unit 100 to drive or stop the electric motor 300. In particular, the motor driver 200 is switched to stop the electric motor 300 that drives the actuator if the control unit 100 determines that the actuator of the construction machine performs the regenerative operation and the energy storage device is in the unchargeable state. Generally, the electric motor used in the hybrid construction machine is a three phase AC electric motor as shown in FIG. 2 and a three phase 6-bridge inverter is used to drive the three phase AC electric motor. FIG. 3 is a timing chart showing the switching order of a motor driver that drives the electric motor.

Hereinafter, the operation of the apparatus for controlling a series hybrid construction machine system in accordance with an embodiment of the present invention will be described with reference to FIGS. 3 and 4.

Figure 4:
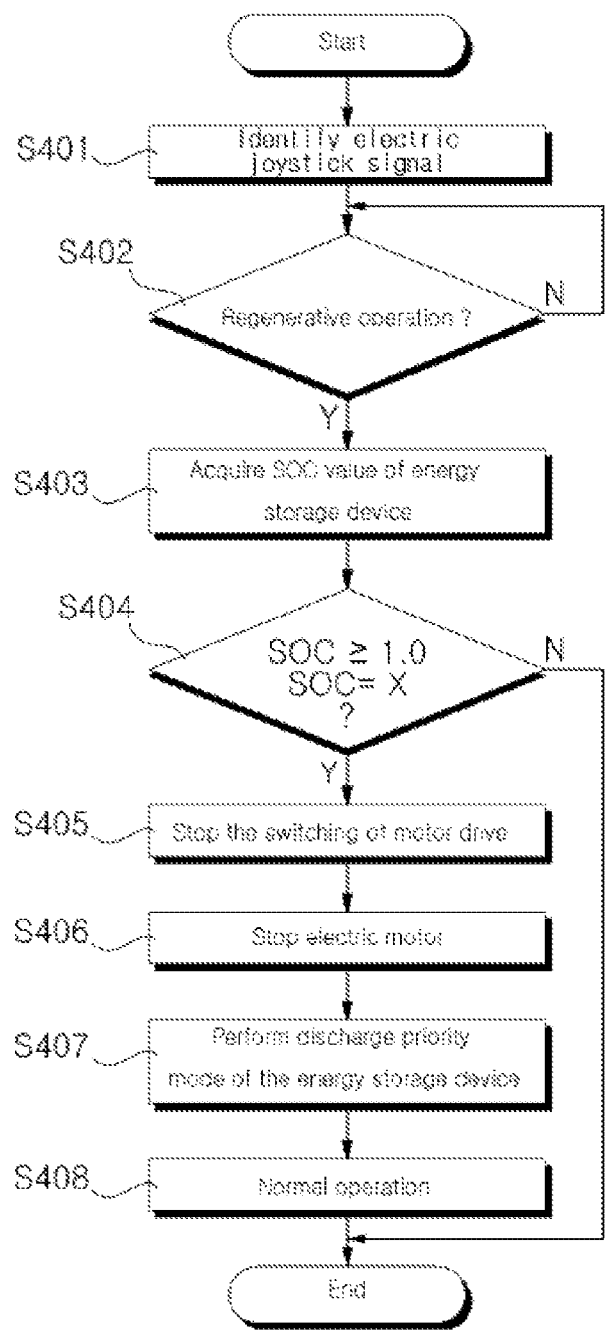
FIG. 4 is a flowchart showing the control operation of an apparatus for controlling a series hybrid construction machine system in accordance with an embodiment of the present invention.

FIG. 3 is a timing chart showing the switching order of a motor driver that drives an electric motor used in an apparatus for controlling a series hybrid construction machine system in accordance with an embodiment of the present invention, and FIG. 4 is a flowchart showing the control operation of an apparatus for controlling a series hybrid construction machine system in accordance with an embodiment of the present invention.

As shown in FIGS. 3 and 4, in the present invention, first, the control unit 100 identifies whether the actuator of the construction machine performs the regenerative operation based on a value obtained by converting a manipulation of an electric joystick into a digital value.

As shown in FIG. 1, generally, the series hybrid construction machine uses a hybrid system as a power source and the electric motor is used to drive the actuator for performing the work. In the series type of the hybrid construction machine, for example, an engine drives a power generator, the power generator charges an electrical energy storage device by its power output, an electric motor is driven by an electrical power of the electrical energy storage device or the power generator, and the electric motor drives a hydraulic pump for an actuator.

Herein, the operation of the actuator used in the present invention is controlled using the drive of the electric motor. Examples of the operation of the actuator include a boom-down operation, an arm-in operation, a bucket-in, and a swing stop operation. The electric motor is used as an electricity generator to generate regenerative energy during the regenerative operation. The regenerative energy is stored in the energy storage device and then is used if necessary.

Generally, the construction machine is manipulated by the electric joystick. The hybrid construction machine employs the electronic joystick so that it can be identified that the actuator performs the regenerative operation by reading an electric signal.

For example, in the case where the boom is manipulated, a value generated from electronic joystick is converted into an AD value so that the boom-up or the boom-down in the regenerative operation can be identified. This method enables only determination of the regenerative operation.

Next, the control unit 100 determines whether the energy storage device is in the unchargeable state based on an SOC (State of Charge) value obtained from the energy storage device.

A method of acquiring an SOC data of the energy storage device can be divided into a battery-based method and a capacitor-based method. In case of the battery-based method, the SOC of the battery can be determined by the amount of current used as follows:

$$SOC = SOC_{int} + \int SOC1\, dt$$

$$SOC1 = -I(t)/Q$$

wherein $SOC_{int}$ is an initial SOC of the battery, Q is a battery capacity (Ah), and I(t) is the amount of current (A).

In case of the capacitor-based method the SOC of the battery can be determined by the following equation:

$$V_{oc} = V_{oc} - I \times 1/C_{tal}\, dt$$

$$SOC = (V_{oc} - V_{min})/(V_{max} - V_{min})$$

wherein $C_{tal}$ is the total capacity of a capacitor, $V_{oc}$ is the current voltage of the capacitor, $V_{max}$ is a maximum terminal voltage of the capacitor, and $V_{min}$ is an minimum terminal voltage of the capacitor.

Subsequently, the control unit 100 controls the motor driver 200 to stop the electric motor 300 that drives the actuator if it is determined that the actuator of the construction machine performs the regenerative operation and the energy storage device is in the unchargeable state as a result of the determination.

For example, the control unit 100 determines that the energy storage device is in the unchargeable state if the SOC value acquired from the energy storage device is equal to or larger than 1 (fully charged state) or the SOC value is not determined to be a constant value (failed state).

The failed state refers to a state in which the regenerative energy cannot be stored in the energy storage device such as destruction of cells due to imbalance between cells of the energy storage device, failure of an energy storage device controller, destruction of the energy storage device due to overcharge/discharge, and failure of the energy storage device.

In other words, the condition where the SOC of the energy storage device acquired using the above equation becomes 100% can occur in the case where an initial SOC of the energy storage device reaches a MAX set value, and a sufficient power is supplied using only the amount of electricity generated from the generator due to a work load that is not large so that the energy storage device is not discharged and only the regenerative energy is supplied through the regenerative operation of the actuator.

In addition to the above case, in case of destruction of cells due to imbalance between cells of the energy storage device, failure of an energy storage device controller, destruction of the energy storage device due to overcharge/discharge, and failure of the energy storage device, a state also occurs in which the regenerative energy cannot be stored in the energy storage device.

If this state continues to be maintained, the system is forcibly stopped or is caused to be destroyed eventually.

Thus, a solution based on the control of the electric motor is needed in order to prevent this state from being maintained To this end, the motor driver 200 is switched to stop the electric motor 300 that drives the actuator under the control of the control unit if the control unit 100 determines that the actuator of the construction machine performs the regenerative operation and the energy storage device is in the unchargeable state.

Generally, the electric motor used in the hybrid construction machine is a three phase AC electric motor as shown in FIG. 2 and a three phase 6-bridge inverter is used to drive the three phase AC electric motor. FIG. 3 is a timing chart showing the switching order of a motor driver that drives the electric motor.

As can be seen from FIG. 3, the drive of the electric motor can performed through a sequential on/off operation of six switches.

In this case, when the conditions as specified above are satisfied, the electric motor must be stopped. At this point, a switching signal must become a 000 or 111 state. This means that an upper stage switch or a lower stage switch is opened.

In this state, a counter electromotive force is generated to cause the electric motor to be stopped by an electric brake.

In the meantime, the control mode of the energy storage device is set to a discharge priority mode to promptly restore the system so that a normal work can be carried out. That is, the control unit 100 performs a discharge priority control of the energy storage device according to the discharge priority mode that is set after the stop of the electric motor 300.

As described above, according to the present invention, the generation of regenerative energy is suppressed by temporarily stopping the electric motor that drives the actuator using the switching of a motor driver during the regenerative operation with respect to an overcharged or failed state of the energy storage device so that the hybrid power source system can be protected and an operator's safety can be ensured. In addition, a problem of work time delay due to the system shutdown can be solved.

Furthermore, the generation of regenerative energy is suppressed through the control of the electric motor that drives the actuator of a series hybrid excavator so that a safe and stable hybrid excavator can be provided to consumers.

INDUSTRIAL APPLICABILITY

As described above, the present invention can be applied to a series hybrid construction machine system configured such that the generation of regenerative energy is suppressed by temporarily stopping the electric motor that drives the actuator using the switching of a motor driver during the regenerative operation with respect to an overcharged or failed state of the energy storage device so that the hybrid power source system can be protected, an operator's safety can be ensured, and a problem of work time delay due to the system shutdown can be solved.

The invention claimed is:

1. An apparatus for controlling a hybrid construction machine in a series type and capable of performing a regenerative operation during at least one of a boom-down, an arm-in, a bucket-in, and a swing stop operation of the machine controlled by employing an electric joystick manipulation for an operation of an actuator, the apparatus comprising:
   a control unit including a first module, a second module, a first control module, and a second control module, and installed at the machine and configured to differently control an electric motor electrically connected to the actuator and configured to drive the actuator based on a result of determining whether the actuator performs the regenerative operation and whether an energy storage device is in an unchargeable state; and
   a motor driver connected to the electric motor and configured to be switched under the control of the control unit to drive or stop the electric motor;
   wherein:
      the first module is configured to identify whether the actuator of the construction machine performs the regenerative operation based on a value obtained by converting the electric joystick manipulation for the operation of the actuator into a digital value;
      the second module is configured to determine whether the energy storage device is in the unchargeable state based on an SOC (State of Charge) value obtained from the energy storage device;
   the first control module is configured to control the motor driver to stop the electric motor that drives the actuator if it is identified that the actuator of the construction machine performs the regenerative operation and the energy storage device is in the unchargeable state as a result of determination by the first and second modules; and
      the second control module is configured to perform a discharge priority control of the energy storage device according to a discharge priority mode that is set after the stop of the electric motor.

2. The apparatus according to claim 1, wherein the second module included with the control unit determines that the energy storage device is in the unchargeable state if the SOC value acquired from the energy storage device is equal to or larger than 1 (fully charged state) or the SOC value is not determined to be a constant value (failed state).

* * * * *